United States Patent Office 3,184,211
Patented May 18, 1965

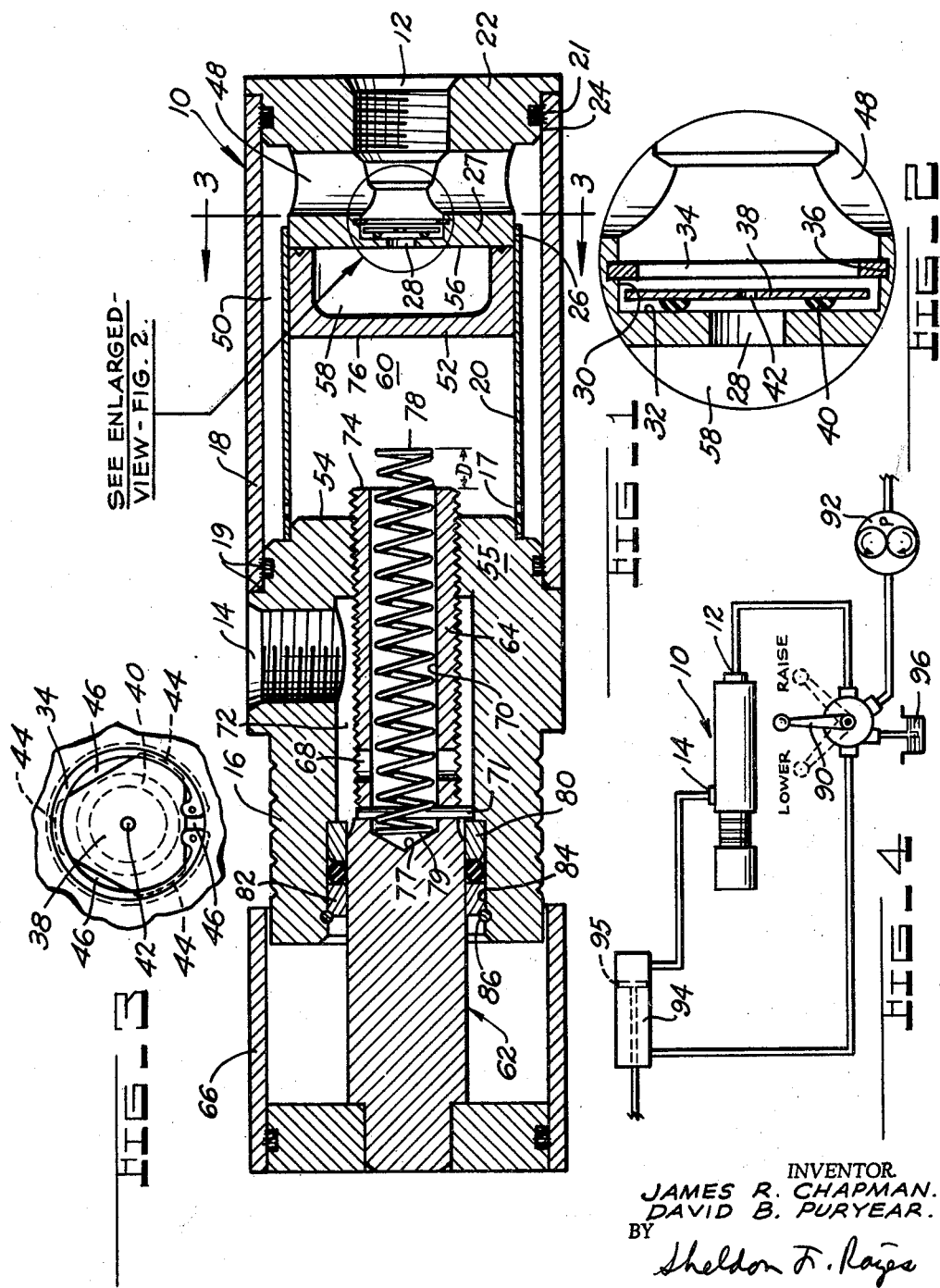

3,184,211
FLOW METERING VALVE
James R. Chapman, St. Joseph, and David B. Puryear, Stevensville, Mich., assignors to The Bendix Corporation, St. Joseph, Mich., a corporation of Delaware
Filed Dec. 31, 1962, Ser. No. 248,645
7 Claims. (Cl. 251—15)

This invention relates to a flow metering valve.

An object of this invention is to provide a flow metering valve wherein a wall is movable to cut off flow through the valve when a predetermined quantity of fluid has passed through the valve.

Another object of this invention is to provide a flow metering valve wherein the quantity of flow passing through the valve may be of variable predetermined amounts before the movable wall cuts off said flow.

A further object of this invention is to provide a flow metering valve wherein flow in one directon for moving the movable wall must pass through restricted opening means and reverse flow produced by reverse movement of said wall passes through unrestricted opening means.

Yet another object of this invention is to provide a flow metering valve wherein resilient means is provided to bias the wall off of its seat, but does not oppose movement of the wall to cut off flow through the valve until the wall approaches the seat for cutting off flow.

An over-all object of this invention is to provide a flow metering valve which is simple and is economically constructed.

Other objects will be obvious to those skilled in the art from the following description with reference to the drawings wherein:

FIGURE 1 is a section view of a flow metering valve;
FIGURE 2 is an enlarged view of a circled portion of the device of FIGURE 1;
FIGURE 3 is a view taken along section line 3—3 of FIGURE 1; and
FIGURE 4 is a schematic view of the valve of the invention incorporated in a fluid system.

Referring to the drawings, there is illustrated a valve housing 10 having an inlet port 12 and an outlet port 14. The valve housing 10 comprises a main body 16 having an outer sleeve 18 silver soldered thereto at 19. An inner sleeve 20 having a plurality of orifices 17 is spaced from the outer sleeve 18 and is press-fitted to the main body 16. A cylindrical plug 22 having radially offset peripheral surfaces 24 and 26 is silver soldered to the outer sleeve 18 at 21 and press-fitted into the inner sleeve 20. The inner portion 27 of the plug 22 contains an opening 28 surrounded by a counterbore comprising an annular wall 30 and a shoulder 32. A snap ring 34 is located within an annular groove 36 of the wall 30. A flat triangular plate 38 having a circular sealing ring 40 surrounding an orifice 42 is located between the shoulder 32 and snap ring 34 so that the sealing ring 40 may seat on the shoulder 32 and the plate 38 can be moved axially against the snap ring 34 to unseat the sealing ring 40. The plate 38 engages the snap ring 34 at three areas 44 leaving openings 46 between the snap ring and the periphery of the plate. A cross bore 48 communicates the opening 28 and the annular space 50 between the sleeves 18 and 20 with the inlet 12.

A wall or piston 52 is slidable within the chamber defined by the end surface 54 of a transverse wall 55 of the main body and the inner end surface 56 of the plug and divides the chamber into two variable volume chambers 58 and 60.

An elongated member 62 has a threaded tubular portion 64 at one end and a cylindrical barrel 66 secured thereto at the other end. The tubular portion 64 has a plurality of ports 68 which open from the tubular passage 70 within the tubular portion to an annular chamber 72 which is in turn communicated to the outlet 14. The tubular portion 64 is threadedly received within the transverse wall 55 of the main body member 16 and the inner passage 70 opens into the chamber 60. An annular seat 74 is formed at the end of the tubular portion 64 and is sealingly engaged by the face 76 of the movable wall or piston 52.

A compression spring 78 for biasing the wall or piston off its seat 74 is disposed within the passage 70 and is so arranged that it will bear against the surface 77 and be compressed by the movable wall 52 only through a distance D. A roll or spring pin 71 is inserted into a small bore in the tubular portion 64 and retains the spring 78 within passage 70 and limits axial retraction of the seat 74 by engagement of the pin with a washer 80. If desired, the spring 78 may be loosely disposed within the tubular passage 70 provided the spring 78 is longer than the maximum distance possible between the surface 76 of the wall 52 and the seat 74 so the spring 78 will not become dislodged from the passage 70. Thus, even if the spring engages the surface 76 of the movable wall 52 for the full stroke thereof, the wall will not move against the force of the spring until the spring end 79 engages the surface 77 at which time compression thereof takes place. The arrangement of spring 78 is of importance since it deviates from a well-known spring arrangement wherein a coil spring is compressed between the surfaces 76 and 54 and the wall 52 must move against the force of the spring throughout its entire stroke. The flow leaving the valve is proportionate to the flow through the inlet orifice 28 which should be a constant ratio. The well-known spring arrangement causes a departure from the desired constant ratio of flow through orifices 42 and 17 resulting in the valve metering flow inaccurately. Since applicants' wall 52 moves against the force of the spring only when it reaches a distance D away from the seat 74, a departure from the constant ratio results only through the distance D which is so slight as to be ignored.

A pair of washers 80 and 82 are disposed within a counterbore 84 and held there by a snap ring 86. An O-ring 88 is located between the two washers 80 and 82 serving to seal the interior of the body member 16 from the exterior thereof. The elongated member 62 is rotatably and slidably received by the washers and upon rotation of the elongated member by manual turning of the barrel 66, the tubular portion 64 will rotate resulting in axial movement of the seat 74 thereby decreasing the stroke of the movable wall 52 and the quantity of fluid passing through the valve before the wall 52 engages the seat 74 to cut off flow.

Operation

The valve of this invention may be utilized in a well-known system such as that illustrated in FIGURE 4.

In operation, a valve lever 90 is moved from its central neutral position to the right to communicate the inlet 12 with a pump 92. Flow through the inlet 12 is split into a path through the orifice 42 into chamber 58 and a path through the cross bore 48, annular passage 50, orifices 17, chamber 60, tubular passage 70, ports 68, annular passage 72, and outlet 14 to a fluid motor 94. The ratio of flow through the orifice 42 to the flow through the orifices 17 is constant, since the pressure drop across these orifices is identical, resulting in a predetermined amount of flow passing through outlet 14 for a predetermined amount of travel of wall 52 until it engages the seat 74 to prevent further flow of fluid to the outlet port 14.

After flow through the valve has ceased, the handle 90 is then moved back to neutral position cutting off communication of the inlet 12 with the pump 92. The spring 78 will bias the wall 52 off the seat 74 a distance D with flow from chamber 58 unseating plate 38 providing unrestricted flow from chamber 58 with movement of the wall 52 being much more rapid in reverse because of the unrestricted flow. Fluid displaced from chamber 52 will pass through cross bore 48, annular passage 50 and orifices 17 into chamber 60. If it is desired to displace piston 94 of the fluid motor 94 further, the lever 90 may again be moved to the right communicating inlet 12 to the pump 92. A predetermined amount of fluid will then pass through the valve 10 to the motor 94 until the wall 52 moves the distance D to shut off flow to the motor thereby providing further displacement of the piston 95 without altering the original setting.

Obviously, if the handle 90 was turned to the left of neutral the pump 92 will be in communication with the left side of the fluid motor and the valve inlet port 12 will be communicated to the reservoir 96 with reverse flow passing from the fluid motor 94, through outlet port 14, ports 68, passages 72, 70, chamber 60, orifices 17, passage 50, cross bore 48, inlet port 12 to the reservoir 96.

From the above description it is seen that the aforementioned objects and others have been accomplished.

We claim:

1. A flow metering valve comprising: a housing having a longitudinal cavity therein, said housing having an inlet and an outlet, a longitudinally extending hollow member located within said cavity, the outer surface of the longitudinal walls of said hollow member being spaced from the inner surface of said cavity forming a fluid passage therebetween, said inlet being communicated with said passage, an outlet port communicating with said outlet and an inlet port comunicating with said inlet located at opposite ends of said hollow member, a movable wall located within said hollow member separating said hollow member into first and second variable volume fluid chambers, said inlet port being communicated with said first chamber and said outlet port being communicated with said second chamber, a seat surrounding said outlet port for engagement by said movable wall, orifice means in said longitudinal wall of said hollow member communicating said second chamber with said passage, said inlet port comprising a bore and a counterbore forming a shoulder element with said bore, said bore being located between said first chamber and said counterbore, a groove in the wall of said counterbore, a snap ring in said groove, a generally flat plate element disposed between said snap ring and said shoulder and having orifice means smaller than said bore and smaller than the opening of said snap ring, said plate being so shaped that peripheral portions thereof will engage and be retained by said snap ring and at the same time form passage means between the spaces defined by other peripheral portions of said plate and the edge of said snap ring opening, a sealing member disposed between said elements, surrounding said bore, dimensionally larger than said bore and attached to one of said elements for sealing engagement with the other of said elements, said snap ring and shoulder being spaced to permit longitudinal movement of said plate element whereby fluid flow entering said first chamber will effect engagement of said other element and said sealing member and will pass only through said plate orifice means and fluid flow from said first chamber will effect disengagement of said other element and said sealing member and pass through said passage means between the periphery of said plate and the edge of said snap ring opening.

2. A flow metering valve comprising: a housing having a longitudinal cavity therein, said housing having an inlet and an outlet, a longitudinally extending hollow member located within said cavity, the outer surface of the longitudinal walls of said hollow member being spaced from the inner surface of said cavity thereby forming a fluid passage therebetween, an outlet port communicating with said outlet and an inlet port communicating with said inlet located at opposite ends of said hollow member, a movable wall located within said hollow member separating said hollow member into first and second variable volume fluid chambers, said inlet port being communicated with said first chamber and said outlet port being communicated with said second chamber, a seat surrounding said outlet port for engagement by said movable wall, orifice means in said longitudinal wall of said hollow member communicating said second chamber with said passage, said inlet and said inlet port being located within an end member at one end of the housing, said end member comprising an axially extending inlet bore, the innermost portion of said inlet bore being communicated with said first chamber and defining said inlet port, said inlet port comprising a bore and a counterbore forming a shoulder with said last named bore, said last named bore being located between said first chamber and said conuterbore, a groove in the wall of said counterbore, a snap ring in said groove, a generally flat plate disposed between said snap ring and said shoulder and having orifice means smaller than said inlet bore and smaller than the opening of said snap ring, said plate being so shaped that it will engage and be retained by said snap ring and at the same time form passage means between the spaces defined by other peripheral portions of said plate and the edge of said snap ring opening, a sealing member surrounding said plate orifice means, dimensionally larger than said last named bore and attached to the surface of said plate facing said shoulder for sealing engagement therewith, said snap ring and shoulder being spaced to permit longitudinal movement of said plate whereby fluid flow entering said first chamber will seat said sealing member against said shoulder and will pass only through said plate orifice means and fluid flow from said first chamber will unseat said sealing member and said plate and pass through said passage means between the periphery of said plate and the edge of said snap ring opening, said end member further having a cross bore intersecting said inlet bore and located between said snap ring and the outermost portion of said inlet bore, said cross bore opening into said fluid passage means.

3. A flow metering valve comprising: a housing having longitudinal first and second cavities therein, said cavities being separated by a first transverse wall, said housing having an inlet communicating with said first cavity and an outlet communicating with said second cavity, a longitudinally extending hollow member located within said first cavity, said first transverse wall and a second transverse wall forming opposite end walls of said hollow member, the outer surface of the longitudinal wall of said hollow member being spaced from the inner surface of said first cavity thereby forming a first fluid passage means therebetween, an outlet port in said first transverse wall communicating with said second cavity and an inlet orifice in said second transverse wall communicating with said inlet, a movable wall located within said hollow member separating said hollow member into first and second variable volume chambers, said inlet orifice being communicated with said first chamber and said outlet port being communicated with said second chamber, a seat surrounding said outlet port for engagement by said movable wall, orifices in the longitudinal wall of said hollow member communicating said second chamber with said first passage means, said outlet port comprising a tubular member received in said first transverse wall and having a portion extending into said second chamber, a coil spring is located within said tubular member and arranged to project into the second fluid chamber less than the distance said movable wall travels when said spring is seated in said tubular member, a space between the outer surface of the wall of said tubular member and the inner surface of said second cavity forming second passage means to said outlet, and at least one opening in said tubular member portion communicating the interior thereof with said second passage means.

4. A flow metering valve comprising: a housing having longitudinal first and second cavities therein, said cavities being separated by a first transverse wall, said housing having an inlet communicating with said first cavity and an outlet communicating with said second cavity, a longitudinally extending hollow member located within said first cavity, said first transverse wall and a second transverse wall forming opposite end walls of said hollow member, the outer surface of the longitudinal walls of said hollow member being spaced from the inner surface of said first cavity thereby forming a first fluid passage means therebetween, an outlet port in said first transverse wall communicating with said second cavity and an inlet port in said second transverse wall communicating with said inlet, a movable wall located within said hollow member separating said hollow member into first and second variable volume fluid chambers, said inlet port being communicated with said first chamber and said outlet port being communicated with said second chamber, said outlet port forming a seat for engagement with said movable wall, orifices in the longitudinal wall of said hollow member communicating said second chamber with said first fluid passage means, said outlet port comprising a tubular member received in said first transverse wall and having a portion extending into said second cavity, said tubular member having at least a portion of the outer surface thereof threaded and said transverse wall having a mating threaded opening for receiving said tubular member, at least one opening in said tubular member, a space between the outer surface of the wall of said tubular member and the inner surface of said second cavity forming second passage means to said outlet, an axially extending member at the exterior of said housing and rotatably mounted to said housing and extending in said second cavity and operatively connected to said second tubular member for rotating the same whereby the distance said movable wall travels may be varied, sealing means between the rotatable member and the inner wall of said second cavity for sealing the second cavity from the exterior of said housing, said inlet port comprising a bore and a counterbore forming a shoulder with said bore, said bore being located between said first chamber and said counterbore, a groove in the wall of said counterbore, a snap ring in said groove, a generally flat plate disposed between said snap ring and said shoulder and having orifice means smaller than said bore and smaller than the opening of said snap ring, said plate being so shaped that it will engage and be retained by said snap ring and at the same time form passage means between the spaces defined by the outer peripheral portions of said plate and the edge of said snap ring opening, a sealing member surrounding said plate orifice means, dimensionally larger than said bore and attached to the surface of said plate facing said shoulder for sealing engagement therewith, said snap ring and shoulder being spaced to permit longitudinal movement of said plate whereby fluid flow entering said first chamber will seat said sealing member against said shoulder and will pass only through said plate orifice means and fluid flow from said plate and pass through said passage means between the periphery of said plate and the edge of said snap ring opening.

5. A flow metering valve comprising: a housing having a longitudinally extending cavity therein, a transverse wall at one end of said cavity, an inlet port communicating with said cavity, a longitudinally extending hollow member located within said cavity, said transverse wall forming one end wall of said hollow member, the outer surface of the longitudinal wall of said hollow member being spaced from the inner surface of said cavity thereby forming fluid passage means therebetween, an outlet port in said transverse wall, a movable wall located within said hollow member separating said hollow member into first and second variable volume chambers, said inlet port being communicated with said first chamber and said outlet port being communicated with said second chamber, a seat surrounding said outlet port for engagement by said movable wall, orifices in the longitudinal wall of said hollow member communicating said second chamber with said passage means, said outlet port comprising a tubular member received in said transverse wall and having a portion extending into said second chamber, a coil spring located within said tubular member and arranged to project into the second fluid chamber less than the distance said movable wall travels when said spring is seated in said tubular member.

6. A flow metering valve comprising: a housing having longitudinal first and second cavities therein, said cavities being separated by a transverse wall at one end of said cavity, said housing having an inlet communicating with said first cavity and an outlet communicating with said second cavity, a longitudinally extending hollow member located within said first cavity, said transverse wall forming one end wall of said hollow member, the outer surface of the longitudinal wall of said hollow member being spaced from the inner surface of said first cavity thereby forming a first fluid passage means therebetween, an outlet port in said transverse wall communicating with said second cavity, a movable wall located within said hollow member separating said hollow member into first and second variable volume chambers, means communicating said first chamber with said inlet, said outlet port being communicated with said second chamber, a seat surrounding said outlet port for engagement by said movable wall, orifices in the longitudinal wall of said hollow member communicating said second chamber with said passage means, said outlet port comprising a tubular member received in said first transverse wall and having a portion extending into said second chamber, a coil spring located within said tubular member and arranged to project into the second fluid chamber less than the distance said movable wall travels when said spring is seated in said tubular member, a space between the outer surface of the wall of said tubular member and the inner surface of said second cavity forming second passage means to said outlet, and at least one opening in said tubular member portion communicating the interior thereof with said second passage means.

7. The structure as recited in claim 6 wherein at least a portion of the outer surface of said tubular member is threaded and said transverse wall has a mating threaded opening for receiving said tubular member, said outlet port forms said seat for said movable wall, an axially extending member is at the exterior of said housing and is rotatably mounted to said housing and extends in said second cavity and is operatively connected to said tubular member for rotating the same whereby the distance said movable wall travels may be varied, sealing means is between said rotatable member and the inner wall of said second cavity for sealing said second cavity from the exterior of said housing.

References Cited by the Examiner
UNITED STATES PATENTS

| 1,414,323 | 4/22 | Barton | 251—360 X |
| 2,664,106 | 12/53 | Livers | 251—16 |
| 2,796,080 | 6/57 | Presnell | 251—16 X |
| 2,923,277 | 2/60 | Waterman | 251—16 |

MARTIN P. SCHWADRON, *Acting Primary Examiner.*
LAVERNE D. GEIGER, *Examiner.*